(12) United States Patent
Tseng et al.

(10) Patent No.: US 7,924,964 B2
(45) Date of Patent: Apr. 12, 2011

(54) RECEIVER WITH THE FUNCTION OF ADJUSTING CLOCK SIGNAL AND AN ADJUSTING METHOD THEREFOR

(75) Inventors: Chao-Kuei Tseng, Tainan County (TW); Shih-Ta Hsu, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 916 days.

(21) Appl. No.: 11/882,982

(22) Filed: Aug. 8, 2007

(65) Prior Publication Data
US 2009/0041091 A1    Feb. 12, 2009

(51) Int. Cl.
*H03D 3/24*    (2006.01)
(52) U.S. Cl. .................................................. 375/373
(58) Field of Classification Search ............ 375/373, 375/375, 376, 371, 354, 358, 241; 331/25
See application file for complete search history.

(56) References Cited

U.S. PATENT DOCUMENTS

| | | | |
|---|---|---|---|
| 7,778,375 B2* | 8/2010 | Lu | 375/375 |
| 2006/0127066 A1* | 6/2006 | Chiu et al. | 388/804 |
| 2008/0266000 A1* | 10/2008 | Ngo et al. | 331/25 |
| 2010/0002822 A1* | 1/2010 | Arima et al. | 375/371 |

* cited by examiner

*Primary Examiner* — Khai Tran
(74) *Attorney, Agent, or Firm* — Rabin & Berdo, P.C.

(57) ABSTRACT

A receiver having a first clock signal is provided. The first frequency of the first clock signal is adjusted to be close to a second frequency of a second clock signal of a transmitter. The receiver includes a clock generator, a processor and a controller. The clock generator is for generating the first clock signal. The processor is for outputting a first control signal to control the clock generator to adjust the first frequency to be close to the second frequency when an absolute value of a current difference between the first and the second frequencies at a current time point is larger than a threshold. The controller is for outputting a second control signal to control the clock generator when the absolute value of the current difference is smaller than the threshold, so as to reduce the load of the processor.

14 Claims, 3 Drawing Sheets

RECEIVER WITH THE FUNCTION OF ADJUSTING CLOCK SIGNAL AND AN ADJUSTING METHOD THEREFOR

BACKGROUND OF THE INVENTION

1. Field of the Invention

The invention relates in general to a receiver, and more particularly to a receiver with the function of adjusting clock signal.

2. Description of the Related Art

The synchronization between a first clock signal generated in a receiver and a second clock signal of a transmitter, for example, a broadcaster which provides digital TV programs, is very essential for the receiver in digital TV technology. The conventional receiver receives a program clock reference (PCR) value corresponding to the frequency of the second clock signal of the transmitter. A processor in the receiver controls the frequency of the first clock signal to be close to the frequency of the second clock signal according to the PCR value.

However, the receiver receives the PCR value about every 40 ms and the processor has to frequently use the PCR value to change the frequency of the first clock signal, which is a heavy load for the processor and reduces the executing efficiency thereof. Therefore, the synchronization between the clock signal in the receiver and the clock signal of the transmitter may not be performed well, and some image frames will not be received successfully, which consequently causes bad display quality. Therefore, it is highly desirable to develop a receiver capable of effectively adjusting its clock signal such that the frequency of which is close to the frequency of the clock signal of the transmitter, and meanwhile improving the executing efficiency of the processor in the receiver.

SUMMARY OF THE INVENTION

The invention is directed to a receiver with the function of adjusting clock signal and an adjusting method thereof. The receiver includes a processor and a controller. The processor adjusts the clock signal in the receiver when the frequency of the clock signal is not close enough to that of the clock signal of the transmitter. When the frequency of the clock signal in the receiver is close to that of the clock signal of the transmitter, the controller adjusts the clock signal in the receiver, so as to reduce the loading of the processor and improve the executing efficiency of the processor.

According to a first aspect of the present invention, a receiver is provided. A receiver includes a clock generator and a controller. The clock generator is for generating a first clock signal. The controller is for outputting a first control signal to control the clock generator to adjust the first frequency of the first clock signal. The first control signal is determined by the difference between the first frequency and a second frequency of a second clock signal of a transmitter.

According to a second aspect of the present invention, an adjusting method is provided. The adjusting method is for adjusting a frequency of a first clock signal in a receiver. The method includes: firstly, adjust the frequency of the first clock signal by a processor according to the difference between the frequencies of the first clock signal and a second clock signal of a transmitter until the absolute value of the difference is smaller than a threshold. Next, adjust the frequency of the first clock signal by a controller according to the difference until the absolute value is over the threshold.

The invention will become apparent from the following detailed description of the preferred but non-limiting embodiments. The following description is made with reference to the accompanying drawings.

DETAILED DESCRIPTION OF THE INVENTION

Figure 1:
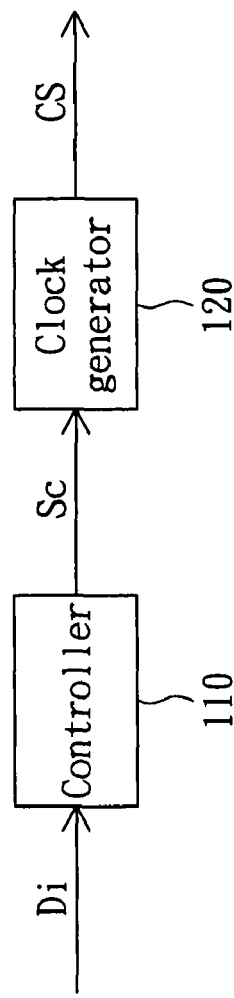
FIG. 1 shows a block diagram of the receiver in accordance with the embodiment of the invention.

FIG. 1 shows a block diagram of the receiver according to an embodiment of the invention. Referring to FIG. 1, the receiver 100 in FIG. 1 includes a controller 110 and a clock generator 120. The controller 110 outputs a control signal Sc to control the clock generator 120 to adjust the frequency of a clock signal CS in the receiver 100. The control signal Sc is determined by the difference Di between the frequencies of the clock signal CS generated by the receiver 100 and a clock signal of a transmitter.

Figure 2:
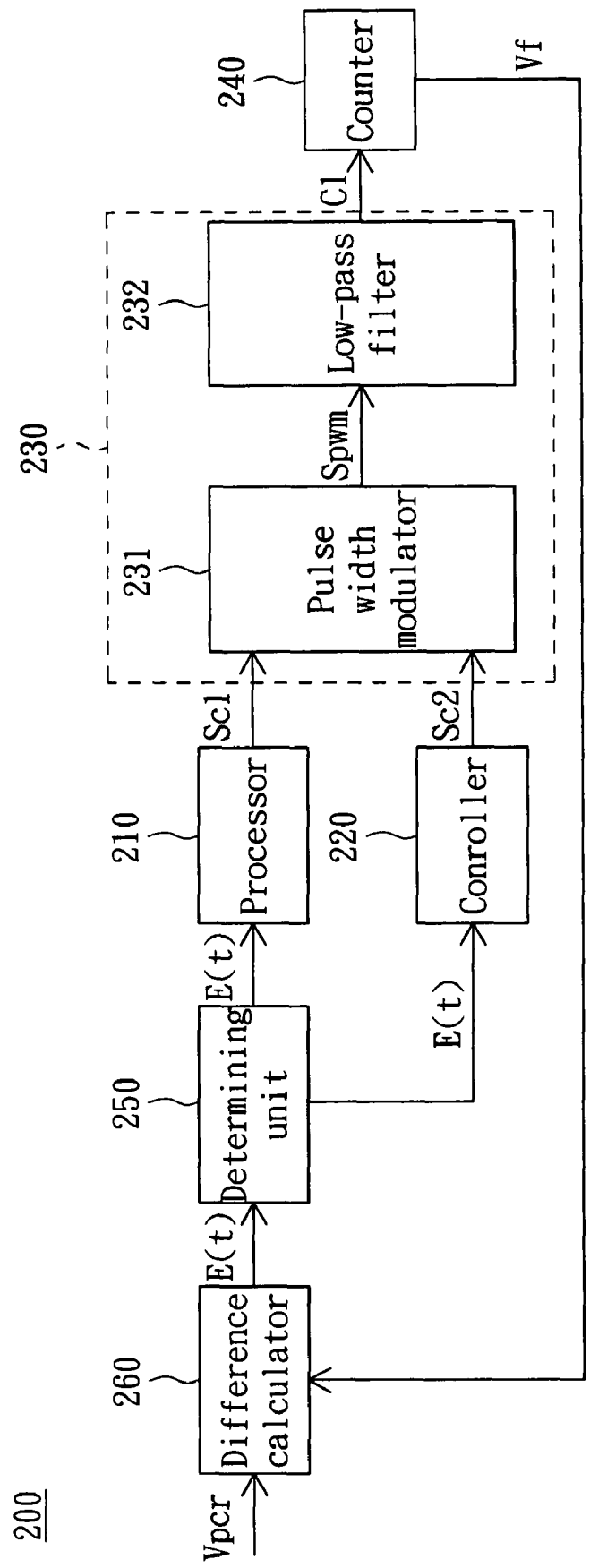
FIG. 2 shows a block diagram of the receiver in accordance with anther embodiment of the invention

FIG. 2 shows a block diagram of the receiver 200 according to anther embodiment of the invention. The frequency of the clock signal C1 generated by the receiver 200 is adjusted to be close to the frequency of the clock signal C2 (not shown) of a transmitter, so that the receiver 200 could receive and decode the data from the transmitter correctly.

The receiver 200 includes a processor 210, a controller 220, and a clock generator 230. When an absolute value of a current difference E(t) between the frequencies of the clock signals C1 and C2 at a current time point t is larger than a threshold, the processor 210 is used to control the clock generator 230. When the absolute value of the current difference E(t) is smaller than the threshold, the controller 220 is used to control the clock generator 230.

When the absolute value of the current difference E(t) is over the threshold, the processor 210 outputs a control signal Sc1 to the clock generator 230 to adjust the frequency of the clock signal C1 to be close to that of the clock signal C2. In this embodiment, the processor 210 performs PI (proportional-integral), PD (proportional-derivative), or PID (proportional-integral-derivative) control processes to control the clock generator 230 to adjust the frequency of the clock signal C1. By performing the PI, PD, or PID control, the processor 210 can effectively synchronize the frequency of the clock signal C1 in the receiver 200 and the frequency of the clock signal C2 of the transmitter.

However, performing the PI, PD, or PID control is a heavy load for the processor 210, which reduces the executing efficiency for the processor 210 to executing other tasks. In the embodiment, the processor 210 controls the clock generator 230 only when the absolute value of the difference E(t) between the frequencies of the clock signals C1 and C2 is larger than the threshold. When the absolute value of the difference becomes smaller than the threshold, the processor 210 stop controlling the clock generator 230 and the controller 220 controls the clock generator 230 instead. Consequently, the loading for the processor 210 could be reduced.

When the absolute value of the current difference E(t) is smaller than the threshold, the controller 220 outputs a control signal Sc2 to control the clock generator 230. When a previous difference E(t−1) between the frequencies of the clock signals C1 and C2 at a previous time point t−1 is positive and the current difference E(t) is larger than the previous difference E(t−1), the controller 220 controls the clock generator 230 to decrease the frequency of the clock signal C1 by an adjusting amount. This situation, in which the previous difference E(t−1) is positive and the current difference E(t) is larger than the previous difference E(t−1), that is, E(t)>E(t−1)>0, implies that the frequency of the clock signal C1 at the current time point t is too high in comparison to that at the previous time point t−1. Therefore, the controller 220 controls the clock generator 230 to decrease the frequency of the clock signal C1 by the adjusting amount, such that the frequency of the clock signals C1 in the receiver 200 will be closer to that of clock signal C2 of the transmitter after adjusted.

When the previous difference E(t−1) is negative and the current difference E(t) is smaller than the previous difference E(t−1), the controller 220 controls the clock generator 230 to increase the frequency of the clock signal C1 by the adjusting amount. The situation, in which the previous difference E(t−1) is negative and the current difference E(t) is smaller than the previous difference E(t−1), that is, E(t)<E(t−1)<0, implies that the frequency of the clock signal C1 at the current time point t is too low in comparison to that at the previous time point t−1. Therefore, the controller 220 controls the clock generator 230 to increase the frequency of the clock signal C1 by the adjusting amount, such that the frequency of the clock signals C1 in the receiver 200 will be closer to that of the clock signal C2 of the transmitter after adjusted.

When the current difference E(t) is larger than the previous difference E(t−1) and the previous difference E(t−1) is negative, that is, E(t−1)<E(t)<0, or when the current difference E(t) is smaller than the previous difference E(t−1) and the previous difference E(t−1) is positive, that is, E(t−1)>E(t)>0, it implies the frequency of the clock signal C1 is more close to the frequency of the clock signal C2 in the current time point t than in previous time point t−1. Therefore, the controller 220 controls the clock generator 230 to keep the frequency of the clock signal C1 unchanged.

Therefore, when the controller 220 is used to control the clock generator 230, if the frequency of the clock signal C1 at the current time point t is too low or too high comparing with that at the previous time point t−1, the controller 220 increases or decreases the frequency of the clock signal C1 by the adjusting amount, such that the frequency of the clock signal C1 can be closer to that of the clock signal C2 after adjusted.

In this manner, the controller 220 repeats controlling the clock generator 230 to adjust the frequency of the clock signal C1 in the receiver 200 when the absolute value of the difference between the frequencies of the clock signal C1 and C2 is kept smaller than the threshold. However, when the absolute value of the difference is changed to be higher than the threshold, which means the controller 220 maybe incapable of adjusting the clock signal C1 efficiently, the controlling process will then be performed by the processor 210 to adjust the clock signal C1. By performing the PI, PD, or PID control, the processor 210 can reduce the difference between the frequencies of the clock signals C1 and C2 quickly. When the absolute value of the difference is reduced to be smaller than the threshold afterward, the controller 220 perform the controlling process again to control the generator 230 to reduce the load of the processor 210.

In practice application, the controller 220 in this embodiment could be implemented by a bang-bang controller. When the controller 220 is implemented by the bang-bang controller, the controller 220 could be operated in a neutral mode, a chilling mode, or a heating mode. When the controller 220 is operated in the neutral mode, the controller 220 adjusts the frequency of the clock signal C1 to be equal to the frequency of the clock signal C1 which has been previously adjusted by the processor 210 before the controller 220 is activated. When the controller 220 is operated at the chilling mode, the controller 220 adjusts the frequency of the clock signal C1 to be equal to the frequency obtained in the neutral mode minus the adjusting amount. When the controller 220 is operated at the heating mode, the controller 220 adjusts the frequency of the clock signal C1 to be equal to the frequency obtained in the neutral mode plus the adjusting amount.

When E(t)>E(t−1)>0, that is, the frequency of the clock signal C1 at the current time point t is too high, the frequency of the clock signal C1 needs to be decreased. If the controller 220 is operated at the neutral mode at the previous time point t−1, then the controller 220 is switched to the chilling mode, such that the frequency of the clock signal is decreased. If the controller 220 is operated at the heating mode at the previous time point t−1, then the controller 220 is switched to the neutral mode, such that the frequency of the clock signal is decreased.

Similarly, when E(t)<E(t−1)<0, that is, the frequency of the clock signal C1 at the current time point t is too low, the frequency of the clock signal C1 needs to be increased. If the controller 220 is operated at the neutral mode at the previous time point t−1, then the controller 220 is switched to the heating mode, such that the frequency of the clock signal is increased. If the controller 220 is operated at the chilling mode at the previous time point t−1, then the controller 220 is switched to the neutral mode, such that the frequency of the clock signal is increased.

The embodiment will be described in more detail as follows. In the embodiment, the clock generator 230 preferably further includes a pulse width modulator 231 and a low-pass filter 232. The pulse width modulator 231 generates a pulse width modulated (PWM) signal Spwm which is adjusted in response to the control signal Sc1 generated by the processor 210 or the control signal Sc2 generated by the controller 220. The low-pass filter 232 performs the low-pass filtering operation on the PWM signal Spwm to output the clock signal C1 accordingly.

In this embodiment, the receiver 200 further comprises a counter 240 and a difference calculator 260. The counter 240 counts the number of pulse, for example, of the clock signal C1 during a predetermined time interval to obtain the frequency of the clock signal C1, and outputs a frequency-counting value Vf corresponding to the frequency of the clock signal C1 in the receiver 200. In this embodiment, the receiver 200 receives the program clock reference (PCR) value Vpcr, corresponding to the frequency of the clock signal C2 of the transmitter. The difference calculator 260 obtains the difference between the frequencies of the clock signals C1 and C2 according to difference of the frequency-counting value Vf and the PCR value Vpcr.

In this embodiment, the receiver 200 further includes a determining unit 250 for determining whether the absolute value of the current difference E(t) is larger than the threshold.

Figure 3A:
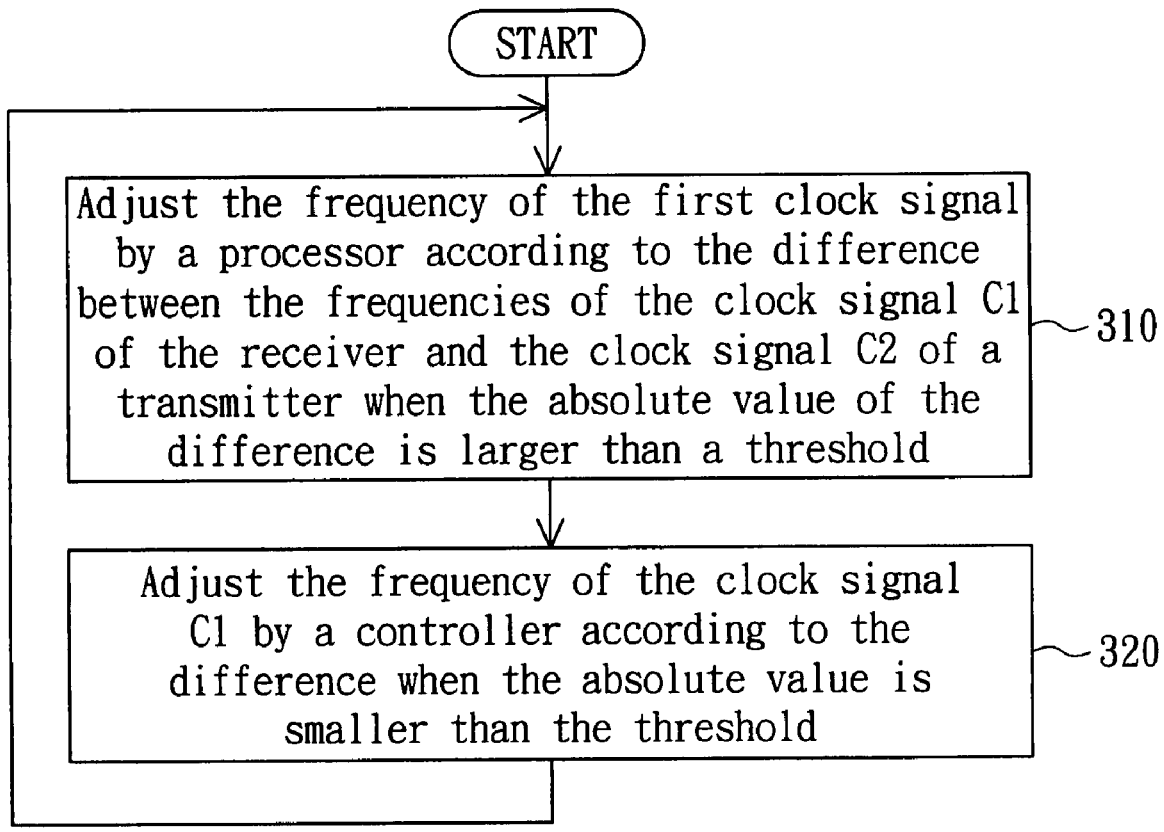
FIG. 3A shows a flow chart of an adjusting method in accordance with the embodiment of the invention.

FIG. 3A shows a flow chart of an adjusting method according to the embodiment of the invention. Referring to FIG. 3A, the method is used in the receiver 200 for adjusting the frequency of the clock signal C1 in the receiver 200. In step 310, control the clock generator 230 in the receiver 200 to adjust the frequency of the clock signal C1 by the processor 210 according to the difference between the frequencies of the clock signal C1 and the clock signal C2 of the transmitter when the absolute value of the difference is larger than the threshold.

When the absolute value of the difference is smaller than the threshold, which means the difference between the frequencies of the clock signals C1 and C2 is smaller than the threshold, the method proceeds to step 320. In step 320, control the clock generator 230 to adjust the frequency of the clock signal C1 by the controller 220 according to the difference when the absolute value of the difference is less than the threshold.

When the absolute value of the difference is over the threshold, which means the controller 220 maybe incapable of adjusting the clock signal C1 efficiently, then the method repeats step 310 to control the clock generator 230 to adjust the frequency of the clock signal C1 by the processor 210 again.

Figure 3B:
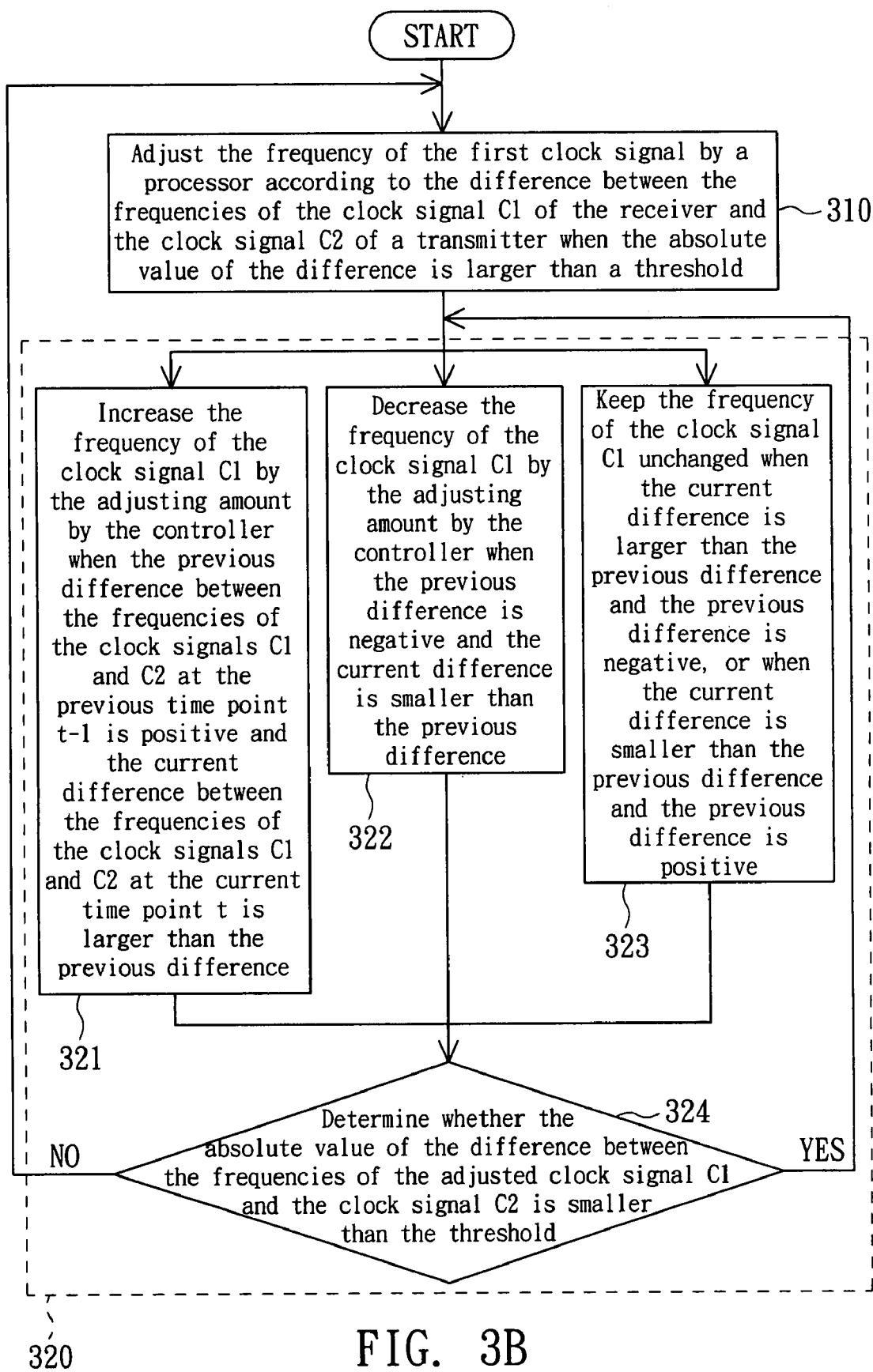
FIG. 3B shows a detail flow chart of the adjusting method in the FIG. 3A

FIG. 3B shows a detailed flow chart of the adjusting method in the FIG. 3A. In the embodiment, step 320 includes steps 321, 322, 323 and 324. When the absolute value of the difference is smaller than the threshold, the method precedes to one of steps 321, 322 and 323. In step 321, increase the frequency of the clock signal C1 by the adjusting amount by the controller 220 when the previous difference E(t−1) between the frequencies of the clock signals C1 and C2 at the previous time point t−1 is positive and the current difference E(t) between the frequencies of the clock signals C1 and C2 at the current time point t is larger than the previous difference E(t−1).

In step 322, decrease the frequency of the clock signal C1 by the adjusting amount by the controller 220 when the previous difference E(t−1) is negative and the current difference E(t) is smaller than the previous difference E(t−1).

In step 323, keep the frequency of the clock signal C1 unchanged when the current difference E(t) is larger than the previous difference E(t−1) and the previous difference E(t−1) is negative, or when the current difference E(t) is smaller than the previous difference E(t−1) and the previous difference E(t−1) is positive.

After the frequency of the clock signal C1 is adjusted, the method precedes to step 324. In step 324, determine whether the absolute value of the difference between the frequencies of the adjusted clock signal C1 and the clock signal C2 is smaller than the threshold. When the absolute value is smaller than the threshold, which means the difference between the frequencies of the clock signals C1 and C2 is still smaller than the threshold, the method repeats one of steps 321, 322 and 323 to adjust the frequency of the clock signal C1 by the controller 220. When the absolute value is over the threshold, the method repeats step 310.

In the receiver according to the embodiment of the invention, the processor adjusts the clock signal in the receiver when the frequency of the clock signal in the receiver is not close enough to that of the clock signal of the transmitter. When the frequency of the clock signal in the receiver is close to that of the clock signal of the transmitter, the processor stops adjusting the clock signal in the receiver and the controller adjusts the clock signal instead. The processor does not have to perform the controlling process all the time. Therefore, the load of the processor is reduced. Hence, the executing efficiency of the processor is improved and meanwhile the frequency of the clock signal in the receiver can be kept close to that of the clock signal of the transmitter.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A receiver, comprising:
   a clock generator for generating a first clock signal;
   a controller for outputting a first control signal to control the clock generator to adjust a first frequency of the first clock signal, wherein the first control signal is determined by a difference between the first frequency and a second frequency of a second clock signal of a transmitter; and
   a processor for outputting a second control signal to control the clock generator to adjust the first frequency to be close to the second frequency when an absolute value of a current difference between the first and the second frequencies at a current time point is larger than a threshold;
   wherein the controller controls the clock generator when the absolute value of the current difference is smaller than the threshold;
   wherein the controller controls the clock generator to decrease the first frequency by an adjusting amount when a previous difference between the first and the second frequencies at a previous time point is positive and the current difference is larger than the previous difference; and
   wherein the controller controls the clock generator to increase the first frequency by the adjusting amount when the previous difference is negative and the current difference is smaller than the previous difference.

2. The receiver according to claim 1, wherein the clock generator further comprises:
   a pulse width modulator for generating a pulse width modulated (PWM) signal which is adjusted by the first control signal or the second control signal; and
   a low-pass filter for performing the low-pass filtering operation on the PWM signal to output the first clock signal accordingly.

3. The receiver according to claim 1, wherein the controller controls the clock generator to keep the first frequency unchanged when the current difference is larger than the previous difference and the previous difference is negative, or when the current difference is smaller than the previous difference and the previous difference is positive.

4. The receiver according to claim 1, wherein the controller is a bang-bang controller.

5. The receiver according to claim 1, wherein the processor is used for performing PI (proportional-integral), PD (proportional-derivative), or PID (proportional-integral-derivative) control processes to control the clock generator to adjust the first frequency.

6. The receiver according to claim 1, further comprising a determining unit for determining whether the absolute value of the current difference is larger than the threshold.

7. The receiver according to claim 1, further comprising a frequency counter for outputting a frequency-counting value corresponding to the first frequency.

8. The receiver according to claim 7, wherein the receiver further comprises a difference calculator to obtain the current and the previous differences between the first frequency and the second frequency according to a difference of the frequency-counting value and a program clock reference (PCR) value, wherein the program clock reference value corresponds to the second frequency and is received from the transmitter by the receiver.

9. An adjusting method for adjusting a frequency of a first clock signal in a receiver, comprising:

adjusting the frequency of the first clock signal by a processor according to a difference between the frequencies of the first clock signal and a second clock signal of a transmitter when the absolute value of the difference is larger than a threshold; and adjusting the frequency of the first clock signal by a controller according to the difference when the absolute value is smaller than the threshold;

wherein the step of adjusting the frequency of the first clock signal by the controller comprises:

increasing the frequency of the first clock signal by an adjusting amount by the controller when a previous difference between the frequencies of the first and the second clock signals at a previous time point is positive and a current difference between the frequencies of the first and the second clock signals at a current time point is larger than the previous difference; and decreasing the frequency of the first clock signal by the adjusting amount by the controller when the previous difference is negative and the current difference is smaller than the previous difference.

10. The adjusting method according to claim 9, wherein the step of adjusting the frequency of the first clock signal by the controller further comprises:

keeping the frequency of the first clock signal unchanged when the current difference is larger than the previous difference and the previous difference is negative, or when the current difference is smaller than the previous difference and the previous difference is positive.

11. The adjusting method according to claim 9, wherein the step of adjusting the frequency of the first clock signal by the controller is a bang-bang control process.

12. The adjusting method according to claim 9, wherein the current and the previous differences between the first and the second frequencies are obtained according to a difference of a frequency-counting value corresponding to the frequency of the first clock signal and a program clock reference (PCR) value corresponding to the frequency of the second clock signal.

13. The adjusting method according to claim 9, wherein in the step of adjusting the frequency of the first clock signal by the controller, the method repeats the step of adjusting the frequency of the first clock signal by the processor when the absolute value is over the threshold.

14. The adjusting method according to claim 9, wherein in the step of adjusting the frequency of the first clock signal by the processor, one of PI (proportional-integral), PD (proportional-derivative), or PID (proportional-integral-derivative) control processes is performed to control the clock generator by the processor.

* * * * *